(12) United States Patent
Thompson et al.

(10) Patent No.: US 11,718,534 B2
(45) Date of Patent: Aug. 8, 2023

(54) SLURRY COMPOSITIONS CONTAINING MIXED BRANCHED ALKYL ORGANOCLAY COMPOSITIONS

(71) Applicant: Elementis Specialties, Inc., East Windsor, NJ (US)

(72) Inventors: Jeffrey Thompson, Hightstown, NJ (US); David Dino, Cranbury, NJ (US); Wouter Ijdo, Yardley, PA (US); Gabriela Barbara Ber, Asbury Park, NJ (US)

(73) Assignee: ELEMENTIS SPECIALTIES, INC., East Windsor, NJ (US)

( * ) Notice: Subject to any disclaimer, the term of this patent is extended or adjusted under 35 U.S.C. 154(b) by 426 days.

(21) Appl. No.: 16/854,478

(22) Filed: Apr. 21, 2020

(65) Prior Publication Data
US 2020/0339429 A1    Oct. 29, 2020

Related U.S. Application Data

(60) Provisional application No. 62/837,501, filed on Apr. 23, 2019.

(51) Int. Cl.
| | |
|---|---|
| *C01B 33/44* | (2006.01) |
| *C08L 33/26* | (2006.01) |
| *C09K 8/32* | (2006.01) |
| *C08L 101/00* | (2006.01) |
| *C09K 8/035* | (2006.01) |
| *C08L 71/02* | (2006.01) |

(52) U.S. Cl.
CPC .............. *C01B 33/44* (2013.01); *C08L 33/26* (2013.01); *C08L 71/02* (2013.01); *C08L 101/00* (2013.01); *C09K 8/035* (2013.01); *C09K 8/32* (2013.01)

(58) Field of Classification Search
CPC .......... C01B 33/44; C08L 33/26; C08L 71/02; C08L 101/00; C09K 8/035; C09K 8/32
USPC ....................................................... 524/450
See application file for complete search history.

(56) References Cited

U.S. PATENT DOCUMENTS

| | | | |
|---|---|---|---|
| 3,642,680 A * | 2/1972 | Jennings et al. ...... | C08F 265/04 524/460 |
| 4,024,148 A | 5/1977 | Davis | |
| 4,371,469 A | 2/1983 | Foglia et al. | |
| 4,683,259 A | 7/1987 | Goodman | |
| 4,683,336 A | 7/1987 | Blackhurst | |
| 4,994,620 A | 2/1991 | Fong et al. | |
| 5,112,519 A | 5/1992 | Giacobbe et al. | |
| 5,336,647 A | 8/1994 | Nae et al. | |
| 5,425,806 A | 6/1995 | Doolan et al. | |
| 5,634,969 A | 6/1997 | Cody et al. | |
| 5,677,473 A | 10/1997 | Tomifuji et al. | |
| 5,718,841 A | 2/1998 | Mardis et al. | |
| 5,739,087 A | 4/1998 | Dennis | |
| 5,849,960 A | 12/1998 | Singleton et al. | |
| 5,879,589 A | 3/1999 | Miyanaga et al. | |
| 5,939,475 A | 8/1999 | Reynolds et al. | |
| 6,008,181 A | 12/1999 | Cripe et al. | |
| 6,020,303 A | 2/2000 | Cripe et al. | |
| 6,150,322 A | 11/2000 | Singleton et al. | |
| 6,262,162 B1 | 7/2001 | Lan et al. | |
| 6,335,312 B1 | 1/2002 | Coffindaffer et al. | |
| 6,462,096 B1 | 10/2002 | Dino et al. | |
| 6,610,770 B1 | 8/2003 | Ross et al. | |

(Continued)

FOREIGN PATENT DOCUMENTS

| | | | |
|---|---|---|---|
| CA | 2641486 A1 | | 8/2007 |
| CN | 102532375 B | * | 7/2014 |

(Continued)

OTHER PUBLICATIONS

International Search Report for corresponding Application No. PCT/US20/29117 dated Jul. 15, 2020, 12 pages.
International Search Report and Written Opinion for corresponding Application No. PCT/US20/29117 dated Jul. 15, 2020, 46 pages.
Brazilian Office Action for corresponding Application No. 112017000341-4, dated Oct. 1, 2019, 6 pages.
Chinese Office Action for corresponding Application No. 201580046089.8, dated Aug. 14, 2019, 4 pages.
Indian Office Action for corresponding Application No. 201717000088, dated Oct. 11, 2019, 7 pages.
Notice of Reasons for Rejection for JP Application No. 2017-501028; dated Mar. 8, 2019; 10 pages.

(Continued)

*Primary Examiner* — Ling Siu Choi
*Assistant Examiner* — Ronald Grinsted
(74) *Attorney, Agent, or Firm* — Carol A. Marmo; Eckert Seamans Cherin & Mellott, LLC

(57) ABSTRACT

A slurry composition comprising: a base oil; a nonionic surfactant; a hydrophilic polymer; and a mixed branched alkyl organoclay composition comprising: a phyllosilicate clay; and a mixture of quaternary ammonium ions, each ion having a formula of $[N-R^1R^2R^3R^4]^+$ wherein, within such mixture of quaternary ammonium ions, one or more of $R^1$, $R^2$ and $R^3$ is each a mixture of branched alkyl groups, each branched alkyl group having 12 to 22 total carbon atoms, a linear backbone and one or more $C_1$ to $C_3$ branching alkyl groups each attached to the linear backbone at a branching carbon position, and within each quaternary ammonium ion and within the mixture of branched alkyl groups, the $C_1$ to $C_3$ branching alkyl groups are linked to the linear backbones at different branching carbon positions as a distribution; and wherein when one or more of $R^2$ and $R^3$ is not a branched alkyl group, $R^2$ and $R^3$ are a first linear alkyl group having 1 to 22 carbon atoms, wherein $R^4$ is selected from the group consisting of a second linear alkyl group having 1 to 6 carbon atoms, an aryl group, and combinations thereof.

22 Claims, No Drawings

(56) References Cited

U.S. PATENT DOCUMENTS

| | | | |
|---|---|---|---|
| 6,656,995 | B2 | 12/2003 | Klendworth et al. |
| 6,794,437 | B2 | 9/2004 | Ross et al. |
| 6,814,797 | B2 | 11/2004 | Kaneko et al. |
| 6,946,567 | B2 | 9/2005 | Zhang et al. |
| 7,098,353 | B2 | 8/2006 | Zhang et al. |
| 7,119,137 | B2 | 10/2006 | Darlington, Jr. et al. |
| 7,148,375 | B2 | 12/2006 | Edward et al. |
| 7,342,136 | B2 | 3/2008 | Kenneally et al. |
| 7,462,730 | B2 | 12/2008 | Raney et al. |
| 7,528,191 | B2 | 5/2009 | Metzemacher et al. |
| 7,629,406 | B2 | 12/2009 | Qian et al. |
| 7,781,390 | B2 | 8/2010 | Singleton et al. |
| 8,193,270 | B2 | 6/2012 | Marx et al. |
| 8,278,282 | B2 | 10/2012 | Yin et al. |
| 8,440,297 | B2 | 5/2013 | Lopez et al. |
| 2004/0042988 | A1 | 3/2004 | Raney et al. |
| 2010/0305008 | A1 | 12/2010 | Dino et al. |
| 2011/0263884 | A1 | 10/2011 | Ngo et al. |
| 2011/0275844 | A1 | 11/2011 | Ngo et al. |
| 2013/0143988 | A1 | 6/2013 | Aucejo Romero et al. |
| 2016/0009900 | A1 | 1/2016 | Ijdo et al. |
| 2016/0009978 | A1 | 1/2016 | Dino et al. |

FOREIGN PATENT DOCUMENTS

| | | | | |
|---|---|---|---|---|
| CN | 102532375 B | | 7/2014 | |
| EP | 0705852 | | 4/1996 | |
| EP | 0705852 B2 | * | 9/2010 | |
| JP | 09-309720 | | 12/1997 | |
| JP | 1059709 A | | 3/1998 | |
| JP | 2001505174 A | | 4/2001 | |
| JP | 2002003832 A | | 1/2002 | |
| WO | 2016007331 A1 | | 1/2016 | |
| WO | WO-2016007331 A | * | 1/2016 | ............. C04B 33/04 |

OTHER PUBLICATIONS

16C82928CN; Chinese Office Action for Application No. 201580046089.8; dated Dec. 29, 2018; 7 pages.
English translation of 16C82928CN; Chinese Office Action for Application No. 201580046089.8; dated Dec. 29, 2018; 8 pages.
Russian Office Action for Application No. 2017103912/05(006862); dated Jan. 31, 19; 7 pages.
English translation of Russian Office Action for Application No. 2017103912/05(006862); dated Jan. 31, 19; 6 pages.
Russian Search Report for Registration No. 201703912/05(006862) PCT/US2015/038593; dated Jan. 31, 19; 2 pages.
English translation of Russian Search Report for Registration No. 201703912/05(006862) PCT/US2015/038593; dated Jan. 31, 19; 2 pages.
Office Action dated Jun. 23, 2015 issued in U.S. Appl. No. 14/329,305 (7 pages).
Olesky et al., Polimery, vol. 52. No. 5, pp. 345-350 (2007.
Dailey, Jr. et al., "Conversioin of Methyl Oleate to Branced -Chain Hydroxy Fatty Acid Derivatives", J. Am. Oil Chem Soc, vol. 86, pp. 1101-1114 (2009).
Kinsman, "Isotearic and Other Branched Acids", J. Am. Oil Chemists Soc., vol. 56, pp. 823-827 (1979).
Ngo et al., "Zeolite-Catalyzed Isomerization of Oleic Acid to Branched-Chain Isomers", Eur. J. Lipid Sci., Technol vol. 108, pp. 214-224 (2007).
Carson et al., Branched-Chain Fatty Acids XII. Preparation of Branched and Normal Acids for Use in th Study of Melting Points of Binary Mixtures, The Chemical Laboratory of the University of California, pp. 139-147, Aug. 2, 1949.
Svensson et al., "The Relationship Between the Structure of Monoalkyl Branched Saturated Fatty Acids and Some Physical Properties", The Americal Oil Chemists' Society, LIPIDS, vol. 28., No. 10, pp. 899-902 (1993).
Hansen et al., "The Branched-Chain Fatty Acids of Butterfat", Fats Research Laboratory, Department of Scientific and Industrial Research, Wellington, NZ, vol. 50, May 16, 1951, pp. 207-210.
Biermann et al., "Synthesis of Alkyl-Branched Fatty Acids", Eur. J. Lipid Sci., Technol., (2008), 110, pp. 805-811.
Sydow, "A Microscopic Investigation of Binary Systems of Long Normal and Iso-Chain Carboxylic Acids", Acta Chemica Scandinavica 8, No. 9, 1954, pp. 1513-1518.
Zhang, et al., "New Process for the Production of Branched-Chain Fatty Acids", Journal of Surfactants and Detergents, vol. 7, No. 3, Jul. 2004, pp. 211-215.
Ngo et al., "Process and Cost Modeling of Saturated Branched-Chain Fatty Acid Isomer Production", Ind. Eng. Chem. Res., (2012), 51, pp. 12041-12045.
Ngo et al., "Synthesis and Physical Properties of Isostearic Acids and Their Esters", Eur. J. Lipid Sci. Technol., (2011), 113, pp. 180-188.
Full Examination Report from the Australian Patent Office corresponding to Australian Application No. 2015288141, dated Jun. 5, 2018, 3 pages.
Extended European Search Report dated Jan. 18, 2018 issued in co-pending European Application.

* cited by examiner

SLURRY COMPOSITIONS CONTAINING MIXED BRANCHED ALKYL ORGANOCLAY COMPOSITIONS

CROSS-REFERENCE TO RELATED APPLICATIONS

This application claims priority benefit from U.S. Provisional Patent Application 62/837,501 filed Apr. 23, 2019 which is incorporated by reference herein in its entirety.

FIELD OF THE DISCLOSURE

The present disclosure provides for a slurry composition comprising: a base oil; a nonionic surfactant; a hydrophilic polymer; and a mixed branched alkyl organoclay composition.

BACKGROUND

Organoclays have been widely utilized as rheology modifiers for paint and coatings, inks, greases, and oil well drilling fluids to increase the viscosity of such system. Organoclay additives are also used as anti-settling agents to prevent particles, present in suspensions, from settling. Typically, organoclay compositions are prepared by the reaction of an organic cation, in particular a quaternary ammonium ion, with clay in various methods known in the art. If the organic cation contains at least one alkyl group containing at least 8 to 22 carbon atoms, then such organoclay compositions typically are more compatible with organic solvents and can be utilized to increase the viscosity and anti-settling properties of organic solvent based systems. Approaches to produce, select, disperse and activate organoclay compositions in organic systems are well known in the art. The viscosity increasing properties can be modified by changing one or more of the four substituents of the quaternary ammonium ion. For example, reports describe that the viscosity efficiency of organoclay compositions was increased by substituting an alkyl group of the quaternary ammonium ion with a 2-hydroxyethyl group, a polyoxyethylene group or ester groups.

A variety of additives are used at the job site when formulating drilling fluids or hydraulic fracturing fluids during oil and gas exploration and production. Suspensions of these additives, also known as slurries, are popular product forms that are easy to use. In such slurries, additive particles are dispersed throughout the bulk of a fluid and can thus easily be transferred, pumped, measured or poured at temperature conditions of the rig site. Slurries of polyacrylamide are commonly used as a drilling adjusting agent. Polyacrylamide functions to regulate the rheology of the drilling fluids to carry cuttings, reduce filtrate loss, or lubricate the drill bit. Shale fracturing operations may use fracturing fluids based on polyacrylamide and polyacrylamide slurries are used in these operations.

SUMMARY

In one embodiment, the present disclosure provides for a slurry composition comprising: a base oil; a nonionic surfactant; a hydrophilic polymer; and a mixed branched alkyl organoclay composition comprising: a phyllosilicate clay; and a mixture of quaternary ammonium ions, each ion having a formula of $[N-R^1R^2R^3R^4]^+$ wherein, within such mixture of quaternary ammonium ions, one or more of $R^1$, $R^2$ and $R^3$ is each a mixture of branched alkyl groups, each branched alkyl group having 12 to 22 total carbon atoms, a linear backbone and one or more $C_1$ to $C_3$ branching alkyl groups each attached to the linear backbone at a branching carbon position, and within each quaternary ammonium ion and within the mixture of branched alkyl groups, the $C_1$ to $C_3$ branching alkyl groups are linked to the linear backbones at different branching carbon positions as a distribution; and wherein when one or more of $R^2$ and $R^3$ is not a branched alkyl group, one or more of $R^2$ and $R^3$ are a first linear alkyl group having 1 to 22 carbon atoms, wherein $R^4$ is selected from the group consisting of a second linear alkyl group having 1 to 6 carbon atoms, an aryl group, and combinations thereof.

In some embodiments of the slurry composition, each mixed branched alkyl group, of the mixed branched alkyl organoclay composition, has 12 to 18 total carbon atoms or 14 to 18 total carbon atoms. In some embodiments of the slurry composition, one or more of $R^2$ and $R^3$ of formula $[NR^1R^2R^3R^4]^+$, of the mixed branched alkyl organoclay composition, are each a first linear alkyl group having 12 to 22 total carbon atoms; 1 to 6 total carbon atoms or 7-11 total carbon atoms. In some embodiments of the slurry composition, $R^4$ of formula $[NR^1R^2R^3R^4]^+$, of the mixed branched alkyl organoclay composition, is independently a benzyl group, a methyl group, an ethyl group, a propyl group, a butyl group, a pentyl group or a hexyl group. In some other embodiments of the slurry composition, one or more of $R^2$ and $R^3$ are methyl and $R^4$ is benzyl, each of the mixed branched alkyl organoclay composition. In some other embodiments of the slurry composition, $R^2$, $R^3$ and $R^4$ of formula $[NR^1R^2R^3R^4]^+$, of the mixed branched alkyl organoclay composition, are each methyl. In other embodiments of the slurry composition, $R^2$ and $R^3$ are methyl and $R^4$ is benzyl of formula $[N-R^1R^2R^3R^4]+$, of the mixed branched alkyl organoclay composition.

The various embodiments of the slurry composition comprise a hydrophilic polymer selected from the group consisting of polyacrylamide, guar, hydroxypropyl guar, hydrophobically modified hydroxypropyl guar, carboxymethyl guar, carboxymethyl hydroxypropyl guar, glactomannan gums, derivatized guars, cellulose, carboxymethyl hydroxyethylcellulose, carboxymethylcellulose, hydroxyethylcellulose, hydroxypropylcellulose, xanthan gum, starch, derivatized starches, saccharides, xanthan, derivatized xanthan and mixtures thereof. In certain such embodiments of the slurry composition, the polyacrylamide is a water-soluble polymer having a charge selected from the group consisting of nonionic, positive, negative, or zwitterionic. In one such embodiment of the slurry composition, the polyacrylamide has a negative charge.

In certain other embodiments of the slurry composition, the hydrophilic polymeric is a guar selected from the group consisting of hydroxypropyl guar, hydrophobically modified hydroxypropyl guar, carboxymethyl guar, carboxymethyl hydroxypropyl guar, glactomannan gums and mixtures thereof.

The various embodiments of the slurry composition comprise a nonionic surfactant independently selected from the group consisting of a $C_6$-$C_{12}$ ethylene oxide polymer, a $C_6$-$C_{12}$ propylene oxide polymer, a $C_6$-$C_{12}$ ethylene-propylene oxide copolymer, and mixtures thereof.

The various embodiments of the slurry composition comprise a base oil is selected from the group consisting of diesel oil, mineral oil, synthetic oil, vegetable oil, fish oil, paraffinics, ester-based oils or combinations thereof.

DETAILED DESCRIPTION OF THE EMBODIMENTS

In polyacrylamide slurries, organoclays are added and activated to maintain the polyacrylamide polymer dispersed in the slurry and to prevent settling. However, pourability or pumpability issues may arise in polyacrylamide slurries that are formulated with an organoclay rheological additive. Exposure to low temperature conditions that exist in many rig surroundings often cause the polyacrylamide slurry to thicken and become non-pourable Conventional organoclay compositions, where the quaternary ammonium ion has only linear alkyl groups, cause this viscosity rise and pourability problem as the temperature falls.

The present disclosure provides for polyacrylamide slurry compositions containing a phyllosilicate clay exchanged with branched alkyl quaternary ammonium ions having a formula of $[NR^1R^2R^3R^4]$ wherein at least one of R, $R^2$ and $R^3$ is a mixture of branched alkyl groups. It has been unexpectedly found that such slurry compositions exhibit different low temperature properties compared to prior art slurry compositions containing organoclay compositions exchanged with quaternary ammonium ions having a formula of $[NR^aR^bR^cR^d]^+$ where one of $R^a$, $R^b$, $R^c$ and $R^d$ is a singly branched alkyl group, such as 12-methyl stearyl or 2-ethylhexyl, having a branching point located at a single position along the linear backbone of the branched alkyl group. Examples of organoclays not encompassed by slurry composition of the present disclosure include dimethyl hydrogenated tallow 2-ethylhexylammonium bentonite or dimethyl hydrogenated tallow 12-methyl stearylammonium bentonite.

In one embodiment, the present disclosure provides for a slurry composition comprising: a base oil; a nonionic surfactant; a hydrophilic polymer; and a mixed branched alkyl organoclay composition comprising: a phyllosilicate clay; and a mixture of quaternary ammonium ions, each ion having a formula of $[N-R^1R^2R^3R^4]^+$ wherein, within such mixture of quaternary ammonium ions, one or more of $R^1$, $R^2$ and $R^3$ is each a mixture of branched alkyl groups, each branched alkyl group having 12 to 22 total carbon atoms, a linear backbone and one or more $C_1$ to $C_3$ branching alkyl groups each attached to the linear backbone at a branching carbon position, and within each quaternary ammonium ion and within the mixture of branched alkyl groups, the $C_1$ to $C_3$ branching alkyl groups are linked to the linear backbones at different branching carbon positions as a distribution; and wherein when one or more of $R^2$ and $R^3$ is not a branched alkyl group, one or more of $R^2$ and $R^3$ are a first linear alkyl group having 1 to 22 carbon atoms, wherein $R^4$ is selected from the group consisting of a second linear alkyl group having 1 to 6 carbon atoms, an aryl group, and combinations thereof.

In some embodiments of the slurry composition, each branched alkyl group, of the mixed branched alkyl organoclay composition, has 12 to 18 total carbon atoms or 14 to 18 total carbon atoms. In some embodiments of the slurry composition, one or more of $R^2$ and $R^3$ of formula $[NR^1R^2R^3R^4]^+$, of the mixed branched alkyl organoclay composition, are each a first linear alkyl group having 12 to 22 total carbon atoms; 1 to 6 total carbon atoms or 7-11 total carbon atoms. In some embodiments of the slurry composition, $R^4$ of formula $[NR^1R^2R^3R^4]^+$, of the mixed branched alkyl organoclay composition, is independently a benzyl group, a methyl group, an ethyl group, a propyl group, a butyl group, a pentyl group or a hexyl group. In some other embodiments of the slurry composition, one or more of $R^2$ and $R^3$ are methyl and $R^4$ is benzyl, each of the mixed branched alkyl organoclay composition. In some other embodiments, $R^2$, $R^3$ and $R^4$ of formula $[NR^1R^2R^3R^4]^+$, of the mixed branched alkyl organoclay composition, are each methyl.

In some embodiments of the slurry composition, each branched alkyl group, of the mixed branched alkyl organoclay composition, one or more of $R^1$, $R^2$ and $R^3$, has a distribution of branching points distributed along the linear backbone of the branched alkyl group ranging from a 2 carbon atom position on the linear backbone, counting from a 1 carbon atom position which is bonded to $N^+$, to a ω-2 carbon atom position, where w is a terminal carbon atom position on the linear backbone. In such embodiments, a methyl branch is at least 50% of the branching alkyl groups based on the total number of branches.

In the various embodiments of the slurry composition described above, the linear backbone, of the branched alkyl group of the mixed branched alkyl organoclay composition, one or more of $R^1$, $R^2$ and $R^3$, contains less 0.5 atom % of quaternary carbon atoms. In other embodiments of the slurry composition, the linear backbone, of the mixed branched alkyl organoclay composition, one or more of $R^1$, $R^2$ and $R^3$, is substantially free of quaternary carbon atoms. In such embodiments, "substantially free of quaternary carbon atoms" shall mean that a quaternary carbon atom is not detected by $C^{13}$ NMR.

In the various embodiments of the slurry composition described above, the phyllosilicate clay comprises a smectite clay. In such embodiments, the smectite clay is independently selected from the group consisting of: montmorillonite, bentonite, hectorite, saponite, stevensite and beidellite. In one such embodiment, the smectite clay is independently selected from bentonite and hectorite, and mixtures thereof.

The mixed branched alkyl organoclay compositions, of the various embodiments of the slurry composition, may contain sufficient quaternary ammonium ions to satisfy 50 to 150 percent of phyllosilicate cation exchange capacity. In some embodiments of the slurry composition, the mixture of quaternary ammonium ions are in a concentration of 90 to 140 percent of phyllosilicate cation exchange capacity wherein the positive charge of the mixture of quaternary ions, in excess of the exchange capacity, is balanced by an inorganic anion or organic anion or anionic polymer. In some embodiments of the slurry composition, the mixture of quaternary ammonium ions are in a concentration of 95 to 130 percent of phyllosilicate cation exchange capacity wherein the positive charge of the mixture of quaternary ions, in excess of the exchange capacity, is balanced by an inorganic anion or organic anion or anionic polymer. Examples of organic anions are found in U.S. Pat. No. 5,718,841 which is incorporated by reference in its entirety herein.

In various embodiments of the slurry composition, the amount of mixed branched alkyl organoclay ranges from 2 wt. % to 6 wt. %; or 2.5 wt % to 5.5 wt. %; or 3 wt. % to 5 wt. %.

The various embodiments of the slurry composition comprise a hydrophilic polymer selected from the group consisting of polyacrylamide, guar, hydroxypropyl guar, hydrophobically modified hydroxypropyl guar, carboxymethyl guar, carboxymethyl hydroxypropyl guar, glactomannan gums, derivatized guars, cellulose, carboxymethyl hydroxyethylcellulose, carboxymethylcellulose, hydroxyethylcellulose, hydroxypropylcellulose, xanthan gum, starch, derivatized starches, saccharides, xanthan, derivatized xanthan and mixtures thereof. In certain such embodiments of the slurry composition, the polyacrylamide is a water-soluble polymer having a charge selected from the group consisting of nonionic, positive, negative, or zwitterionic. In one such embodiment of the slurry composition, the polyacrylamide has a negative charge. In various of the foregoing embodiments of the slurry composition, the amount of hydrophilic polymer ranges from 25 wt. % to 40 wt. %; or from 30 wt. % to 40 wt. %. In such embodiments of the slurry composition, the amount of polyacrylamide ranges from 25 wt. % to 40 wt. %; or from 30 wt. % to 40 wt. %.

In certain other embodiments of the slurry composition, the hydrophilic polymeric is a guar selected from the group consisting of hydroxypropyl guar, hydrophobically modified hydroxypropyl guar, carboxymethyl guar, carboxymethyl hydroxypropyl guar, glactomannan gums and mixtures thereof. In such embodiments of the slurry composition, the amount of guar ranges from 25 wt. % to 40 wt. %; or from 30 wt. % to 40 wt. %.

The various foregoing embodiments of the slurry composition comprise a nonionic surfactant independently selected from the group consisting of a $C_6$-$C_{12}$ ethylene oxide polymer, a $C_6$-$C_{12}$ propylene oxide polymer, a $C_6$-$C_{12}$ ethylene-propylene oxide copolymer, and mixtures thereof. In various of the foregoing embodiments of the slurry composition, the amount of nonionic surfactant ranges from 0.4 wt. % to 5 wt. %; or 0.5 wt. % to 4 wt. %; or 0.5 wt. % to 3 wt. %; or 0.5 wt. % to 2 wt. %.

The various foregoing embodiments of the slurry composition comprise a base oil is independently selected from the group consisting of diesel oil, mineral oil, synthetic oil, vegetable oil, fish oil, paraffinics, ester-based oils or combinations thereof. In various of the foregoing embodiments of the slurry composition, the amount of base oil ranges from 50 wt. % to 70 wt. %; or 50 wt. % to 60 wt. %.

An embodiment of the slurry composition, of the present disclosure, comprises a base oil; a nonionic surfactant; a hydrophilic polymer; and a mixed branched alkyl organoclay composition comprising: a phyllosilicate clay; and a mixture of quaternary ammonium ions, each ion having a formula of $[N-R^1R^2R^3R^4]^+$ wherein, within such mixture of quaternary ammonium ions $R^1$ and $R^2$ are each a mixture of branched alkyl groups, each branched alkyl group having 12 to 18 total carbon atoms or 14 to 18 total carbon atoms, a linear backbone and one or more $C_1$ to $C_3$ branching alkyl groups each attached to the linear backbone at a branching carbon position, and within each quaternary ammonium ion and within the mixture of branched alkyl groups, the $C_1$ to $C_3$ branching alkyl groups are linked to the linear backbones at different branching carbon positions as a distribution; and wherein $R^3$ and $R^4$ are each a methyl group. In such embodiment, the hydrophilic polymer is independently selected from the group consisting of polyacrylamide, guar and combinations thereof, the surfactant is independently selected from the group consisting of a $C_6$-$C_{12}$ ethylene oxide polymer, a $C_6$-$C_{12}$ propylene oxide polymer, a $C_6$-$C_{12}$ ethylene-propylene oxide copolymer, and mixtures thereof, and the base oil is independently selected from the group consisting of diesel oil, mineral oil, synthetic oil, vegetable oil, fish oil, paraffinics, ester-based oils or combinations thereof.

Another embodiment of the slurry composition, of the present disclosure, comprises a base oil; a nonionic surfactant; a hydrophilic polymer; and a mixed branched alkyl organoclay composition comprising: a phyllosilicate clay; and a mixture of quaternary ammonium ions, each ion having a formula of $[N-R^1R^2R^3R^4]^+$ wherein, within such mixture of quaternary ammonium ions $R^1$ is a mixture of branched alkyl groups, each branched alkyl group having 12 to 18 total carbon atoms or 14 to 18 total carbon atoms, a linear backbone and one or more $C_1$ to $C_3$ branching alkyl groups each attached to the linear backbone at a branching carbon position, and within each quaternary ammonium ion and within the mixture of branched alkyl groups, the $C_1$ to $C_3$ branching alkyl groups are linked to the linear backbones at different branching carbon positions as a distribution; and wherein $R^2$, and $R^3$ are each a methyl group and $R^4$ is a methyl group or a benzyl group. In such embodiment, the hydrophilic polymer is independently selected from the group consisting of polyacrylamide, guar and combinations thereof, the surfactant is independently selected from the group consisting of a $C_6$-$C_2$ ethylene oxide polymer, a $C_6$-$C_{12}$ propylene oxide polymer, a $C_6$-$C_{12}$ ethylene-propylene oxide copolymer, and mixtures thereof, and the base oil is independently selected from the group consisting of diesel oil, mineral oil, synthetic oil, vegetable oil, fish oil, paraffinics, ester-based oils or combinations thereof.

For the purposes of this application, pourability is related to the ability to pump a slurry composition at the temperature conditions of the rig site. To simulate conditions of pumping a slurry composition from a drum at a rig site, a modified pour point determination was used. The pour point was determined by placing the 40° F. stored slurry and the −15° F. stored slurry on a ring stand at 450 angle. A digital thermometer probe was placed an inch above each slurry surface. The 40° F. stored slurry and the −15° F. stored slurry were each warmed to room temperature. As the slurry composition warmed enough to pour it touched the thermometer and the temperature was recorded. Additionally, the warmed slurry composition was mixed with the thermometer probe (to homogenous, no lumps) and the temperature was recorded. An average value of the two temperatures was taken to determine the pour point/pourability of each slurry composition.

Preparation of Quaternary Ammonium Ions

Quaternary ammonium ions are obtained when fatty amines are quaternized with alkylating agents such as methyl chloride, benzyl chloride and the like. Note that the fatty amines may contain one or more of alkyl chains per amine group. Various commercial processes have been developed to produce fatty (long alkyl chain) amines. Fatty acids can be readily converted into fatty amines using a nitrile path as outlined in U.S. Pat. No. 5,634,969 for instance. Fatty amines may also be prepared by reacting fatty alcohol with aminating agents as disclosed in, for instance, U.S. Pat. Nos. 4,683,336 or 4,994,620. Alternatively, long alkyl chain internal- and/or terminal-olefins can be converted into fatty amines via hydrobromination and reaction with aminating agents as disclosed in U.S. Pat. Nos. 4,024,189 or 7,342,136. Said olefins can be obtained through oligomerization of shorter olefins or by cracking larger paraffin wax type molecules.

Fatty alkyl chains can be derived from a variety of natural oleo-chemical sources. These sources can be used to supply raw materials for either the nitrile or alcohol routes that yield fatty amines. Palm or tallow fatty acids are popular raw materials for organoclay manufacture because of cost and availability. The majority of fatty acids that are derived from animal or plant sources are linear. Fatty acids can be converted to fatty alcohols which then are used in the fatty alcohol route to make fatty amines.

Saturated branched chain fatty acids can also be obtained from natural fatty acids. Isostearic acid is a byproduct in the dimer acid production but yields are relatively low making such materials expensive. Recently, significant advances have been made to isomerize natural feed stocks so that linear alkyl chains can be converted into branched alkyl chains, U.S. Pat. No. 5,677,473. Technology described in US 2011/0263884 discloses a high yield skeletal isomerization process of unsaturated linear fatty acids such as oleic acid. The process is highly selective and cost effective (Ind. Eng. Chem. Res. 2012, 51, 12041-12045). Isostearic acid typically is an isomeric mixture where the branching occurs at various positions along the chain. Isostearic acids are commercially available under the Century, Emersol, Emery, Oxocol and Prisorine brand names.

Petrochemical processes have been developed that convert natural gas or olefins such as ethylene, propylene and the like, into fatty alkyl chains to prepare products such as, for example, fatty alcohols. Cracking of paraffin can also yield long chain olefins that can be converted into fatty alcohols via a hydroformylation process. The performance of petrochemical based linear primary alcohols and derivatives are in many applications comparable to oleo-based alcohol products because the chemical composition is essentially the same. However, the various petrochemical processes can also yield chains with a certain degree of branching. Ziegler, Fisher-Tropsch, Oxo and Querbet alcohols all contain varying degrees of branched alkyl chains. Typical long chain petrochemical alcohols that are commercially available are NEODOL (Shell), EXXAL (Exxon) and ALFOL, SAFOL, MARLIPAL, ISALCHEM, ALCHEM and LIAL (Sasol) alcohols. U.S. Pat. Nos. 5,849,960, 6,150,322, 7,781,390 and references therein describe processes and compositions of linear as well as branched petrochemical alcohols. The skeletal isomerization of long chain olefins into branched olefins followed by selective hydroformylation yield branched alcohols such as NEODOL 67, which is a highly branched alcohol (Handbook of Detergents, Part F: Production). Hence, alkyl branching can occur at any location around the alkyl chain, and the branching group can be methyl, ethyl or even longer alkyl groups. The average number of branching per alkyl chain can be determined with $^1$H and $^{13}$C NMR analysis, while alkyl chain length distribution can be estimated with GC. An average branching per alkyl chain above unity means that some alkyl chains have more than one branch per alkyl chain.

For the purposes of this application, the term "about" means plus or minus 10%.

EXAMPLES

The following examples further describe and demonstrate illustrative embodiments within the scope of the present invention. The examples are given solely for illustration and are not to be construed as limitations of this invention as many variations are possible without departing from the spirit and scope thereof.

Quaternary ammonium compounds bearing a mixture branched alkyl groups may be made with any known process. Non limiting synthesis examples to prepare such mixture of branched quaternary ammonium compounds are given below starting with a mixture of branched alcohols as the mixture of branched alkyl source or the mixture of branched fatty acids as the mixture of branched alkyl source.

Example 1

A. Synthesis of Benzyl Dimethyl (Branched Alkyl) Quaternary Ammonium Chloride

Step 1: Synthesis of a (Branched Alkyl) Bromide from a (Branched Alkyl) Alcohol.

In a 1 L, three-necked flask, fitted with a mechanical stirrer, a thermometer, and a dropping funnel, is placed 113 g of Neodol 67 alcohol. Neodol 67 (Shell) mainly is a mixture of $C_{16}$ and $C_{17}$ branched primary alcohols and is produced through selective hydroformylation of branched olefins, which are derived from ethylene. The hydrocarbon backbone of Neodol 67 is linear with one or more methyl branching groups directly bonded to the backbone. These methyl branches are located various branching positions along the linear backbone as a distribution of branching positions. The alcohol is cooled to 0° C. by immersing the flask in an ice bath, and 55 g of phosphorus tribromide is slowly added with stirring at such a rate as to keep the temperature at 0° C. (about two hours). The cooling bath is removed, and stirring is continued until the mixture reaches room temperature; it is then allowed to stand overnight.

To the flask was added 200 ml diethyl ether and 200 ml deionized water. The pH of the mixture was adjusted to neutral with 5% potassium hydroxide under ice bath cooling. Subsequently the solution was transferred to a separatory funnel, the bottom layer was drained and the top layer was washed with brine solution three times. The top layer was then collected and filtered to remove white precipitate; about 105 g of branched alkyl bromide was thus collected after diethyl ether was removed by rota-evaporation.

Step 2: Synthesis of a Dimethyl (Branched Alkyl) Tertiary Amine

A total of 30.7 g of branched alkyl bromide (from Step 1) was added to 147 ml of dimethylamine ethanolic solution. The mixture is stirred at room temperature for 24 hours, then a 10% aqueous solution of sodium hydroxide is added and the mixture is extracted three times with diethyl ether. The organic layers were washed, dried and then concentrated.

Step 3: Synthesis of Benzyl Dimethyl (Branched Alkyl) Quaternary Ammonium Chloride A four-neck, 250 mL round-bottom flask equipped with a reflux condenser, thermocouple and 2 glass stoppers is charged with 20 g of dimethyl (branched alkyl) tertiary amine (from Step 2), 5.8 g of benzyl chloride and roughly 100 mL isopropyl alcohol. Next, 3.5 g of sodium bicarbonate was added to the mixture under stirring and the flask was kept at 75° C. for 48 hours. Then the reaction mixture was filtered hot over a Buchner funnel equipped with filter paper to remove solid sodium bicarbonate. Ethanol was removed by rota-evaporation, and the residue was dissolved in 100 ml of diethyl ether and extracted with three portions of 100 ml deionized water, all aqueous extracts were then combined and water was removed by rota-evaporation.

B. Mixed Branched Alkyl Organoclay Preparation

A sodium bentonite clay ore from Wyoming was dispersed in water at about 5 wt. % clay solids. The crude clay slurry was mixed overnight at ambient temperature and then centrifuged to yield a beneficiated clay slurry. Roughly 30 wt % of the crude bentonite clay was discarded during the beneficiation process, and the resulting purified clay slurry was ion exchanged into the sodium form prior to shearing with a Manton Gaulin homogenizer. The beneficiated and sheared clay had a cation exchange capacity of about 102 milliequivalents (meq.) per 100 grams clay as determined by the methylene blue method. The clay slurry was diluted with water to yield 2% clay solids at reaction and then heated to 65° C. prior to reaction with a certain cation exchange equivalent of benzyl dimethyl (branched alkyl) quaternary ammonium chloride, per 100 grams of clay (dry basis). After reaction, the organoclay was filtered, dried in a forced air oven set at 45° C. and milled to a fine powder.

Example 2

A. Synthesis of Dimethyl Di(Branched Alkyl) Quaternary Ammonium Bromide

Using a branched petrochemical alcohol as the starting material, a (branched alkyl) bromide and dimethyl (branched alkyl) tertiary amine were prepared as described in steps 1 and 2 of Example 1A.

A four-neck, 250 mL round-bottom flask equipped with a reflux condenser, thermocouple and 2 glass stoppers is charged with 25 g of dimethyl (branched alkyl) tertiary amine, 15.2 g of (branched alkyl) bromide and about 100 mL isopropyl alcohol. Next, 4.4 g of sodium bicarbonate was added to the mixture under stirring and the flask was kept at 75° C. for 120 hours or longer until the amine value is below one. Then the reaction mixture was filtered hot over a Buchner funnel equipped with filter paper to remove solid sodium bicarbonate. Isopropyl alcohol was removed by rota-evaporation. Purity of the final product was confirmed with $^1$H NMR.

B. Mixed Branched Alkyl Organoclay Preparation

A mixed branched alkyl organoclay was prepared according to the procedure of Example 1B using dimethyl di(branched alkyl) quaternary ammonium bromide as the mixed quaternary ammonium compound.

Example 3

A. Synthesis of Dimethyl Di(Branched Alkyl) Quaternary Ammonium Bromide

A dimethyl di(branched alkyl) quaternary ammonium bromide compound was prepared as described in Example 2A where the branched alkyl group was derived from a branched fatty acid compound.

Step 1: Prisorene 3515 (Croda) isostearyl alcohol was used in the synthesis of a branched alkyl bromide in a similar manner as described in Example 1, Step A1. Prisorene 3515 is a fully hydrogenated alcohol and is derived from isostearic acid, which is a branched-chain fatty acid derived from vegetable oils or animal fats. Isostearic acid is not a single molecule, but an isomeric mixture in which the branching occurs at different positions along the alkyl chain. The branching is short, mostly methylenic and multiple branching also occurs in small amounts.

Step 2: Synthesis of a Dimethyl (Branched Alkyl) Tertiary Amine

The branched alkyl bromide, derived from isostearyl alcohol, was mixed with dimethylamine ethanolic solution. The mixture is stirred at room temperature for 24 hours, then a 10% aqueous solution of sodium hydroxide is added and the mixture is extracted three times with diethyl ether. The organic layers were washed, dried and then concentrated.

Step 3: Synthesis of Dimethyl Di(Branched Alkyl) Quaternary Ammonium Bromide

The procedure of Example 2 was followed using the branched alkyl bromide and dimethyl (branched alkyl) tertiary amine each derived from isostearyl alcohol.

B. Mixed Branched Alkyl Organoclay Preparation.

A mixed branched alkyl organoclay was prepared according to Example 1B, using a cation exchange equivalent of a dimethyl di(branched alkyl) quaternary ammonium bromide compound where the branched alkyl groups were obtained from an isostearyl alcohol.

Example 4

Slurry compositions were prepared containing 60 wt. % mineral oil (CAS No. 64741-85-1), the organoclay from Example 3, 35 wt. % anionic polyacrylamide, Flojet DRP 2340, ("PAM") and a surfactant. The various amounts of mixed branched alkyl organoclay and surfactant are shown in Table 1. Tergitol is a secondary alcohol ethoxylate non-ionic surfactant. The slurries were prepared in a 1-liter stainless steel beaker using an overhead stir motor equipped with a 4-progged, 2.5 cm×1.0 cm stir-blade. The slurry composition was divided into three portions in glass jars. One portion of the slurry composition was stored at room temperature, a second sample of the slurry composition was stored at 40° F., and a third sample of the slurry composition was stored at −15° F.

Syneresis and settling were determined by eye and hand. To determine the syneresis, the amount of phase separation, the slurry top was measured and quantified as none, slight (less than 1%), moderate (less than 5%), and greater than 5%. Settling was determined by placing a spatula into the glass jar and feeling the sediment on the bottom of the slurry. Additionally, the jar was tipped to visualize the amount of settling that remained in the slurry. The settling was measured and again quantified as none, slight (less than 1%), moderate (less than 10%), and greater than 10%.

To simulate conditions of pouring slurry from a drum at a rig site, a modified pour point determination was used. The pour point was determined by placing the 40° F. stored slurry and the −15° F. stored slurry on a ring stand at 45° angle. A digital thermometer probe was placed an inch above each slurry surface. The 40° F. stored slurry and the −15° F. stored slurry were each warmed to room temperature. As the slurry warmed enough to pour it touched the thermometer and the temperature was recorded. Additionally, the warmed slurry was mixed with the thermometer probe (to homogenous, no lumps) and the temperature was recorded. An average value of the two temperatures was taken to determine the pour point/pourability of each slurry.

| Wt. % of mixed branched alkyl organoclay and Wt. % of surfactant in slurry | 1 day at 40° F. Pourability | 1 day at −15° F. Pourability |
| --- | --- | --- |
| 4 wt. % Example 3<br>0.5 wt. % Tergitol 15-S-3 | Pourable, slight phase separation, set. | Pourable, slight phase separation, set. |
| 4 wt. % Example 3<br>0.5 wt. % Tergitol 15-S-7 | Pourable, slight phase separation, set. | Pourable, slight phase separation, set. |
| 4 wt. % Example 3<br>0.5 wt. % Tergitol 15-S-9 | Pourable, slight phase separation, set. | Pourable, slight phase separation, set. |
| 4 wt. % Example 3<br>0.5 wt. % Tergitol 15-S-12 | Pourable, slight phase separation, set. | Pourable, slight phase separation, set. |
| 4 wt. % Example 3<br>0.5 wt. % Tergitol 15-S-15 | Pourable, slight phase separation, set. | Pourable, slight phase separation, set. |
| 4 wt. % Example 3<br>0.5 wt. % Tergitol 15-S-30 | Pourable, slight phase separation, set. | Pourable, slight phase separation, set. |

-continued

| Wt. % of mixed branched alkyl organoclay and Wt. % of surfactant in slurry | 1 day at 40° F. Pourability | 1 day at −15° F. Pourability |
|---|---|---|
| 4.8 wt. % Example 3 0.5 wt. % Tergitol 15-S-3 | Semi-Pourable | Gel Not Pourable |
| 4.8 wt. % Example 3 0.9 wt. % Tergitol 15-S-3 | Pourable | Semi-Pourable |
| 4.4 wt. % Example 3[1] 0.5 wt. % Nuosperse FN211 | Pourable | Pourable |
| 4.4 wt. % Example 3[1] 0.9 wt. % Nuosperse FN211 | Pourable | Pourable |

[1]No syneresis was observed.

Example 5

Slurry compositions were prepared containing 60 wt. % mineral oil (CAS No. 64741-85-1), the mixed branched alkyl organoclay from Example 3, 35 wt. % anionic polyacrylamide, Flojet DRP 2340, ("PAM"), and a surfactant. The various amounts of organoclay and surfactant are shown in Table 2. Nuosperse 211 is an alcohol functionalized ethyoxylate/propoxylate non-ionic surfactant. The slurries were prepared in a 1-liter stainless steel beaker using an overhead stir motor equipped with a 4-progged, 2.5 cm×1.0 cm stir-blade. The slurry composition was placed in a jar and froze to −60° F. using liquid nitrogen. The pour point was measured as described in Example 4.

| Wt. % of mixed branched alkyl organoclay and Wt. % of surfactant in slurry | 1 day at 40° F. Pourability | 1 day at −15° F. Pourability | −60° F. Pour Point |
|---|---|---|---|
| 4.8 wt. % Example 3 1.3 wt. % Tergitol 15-S-3 | Pourable | Pourable | Pour point less than −25° F. |
| 4.4 wt. % Example 3 1.3 wt. % Nuosperse FN211 | Pourable | Pourable | Pour point less than −26° F. |

Comparative Example

Comparative slurry composition was prepared containing 60 wt. % mineral oil (CAS No. 64741-85-1), a comparative organoclay ("Comparative OC") exchanged with two methyl two hydrogenated tallow quaternary ammonium ion, 35 wt. % anionic polyacrylamide, Flojet DRP 2340, ("PAM"), 1.7 wt. % propylene carbonate and a surfactant.

| Wt. % of Comparative OC and Wt. % of surfactant in slurry | 1 day at 40° F. Pourability | 1 day at −15° F. Pourability | −60° F. Pour Point |
|---|---|---|---|
| 3.7 wt. % Comparative OC 0.5 wt. % Nuosperse FN211 | Pourable | Not Pourable | Pour point = 32° F. |
| 4 wt. % Comparative OC 0.5 wt. % Nuosperse FN211 | Pourable | Not Pourable | Pour point = 32° F. |
| 4 wt. % Comparative OC 1.3 wt. % Nuosperse FN211 | Pourable | Not Pourable | Pour point = 32° F. |

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A slurry composition comprising:
    a base oil;
    a nonionic surfactant;
    a hydrophilic polymer; and
    a mixed branched organoclay composition comprising: a phyllosilicate clay; and a mixture of quaternary ammonium ions, each ion having a formula of $[N-R^1R^2R^3R^4]^+$ wherein, within such mixture of quaternary ammonium ions, one or more of $R^1$, $R^2$ and $R^3$ is each a mixture of branched alkyl groups, each branched alkyl group having 12 to 22 total carbon atoms, a linear backbone and one or more $C_1$ to $C_3$ branching alkyl groups each attached to the linear backbone at a branching carbon position, and within each quaternary ammonium ion and within the mixture of branched alkyl groups, the $C_1$ to $C_3$ branching alkyl groups are linked to the linear backbones at different branching carbon positions as a distribution; and wherein when one or more of $R^2$ and $R^3$ is not a branched alkyl group, one or more of $R^2$ and $R^3$ are a first linear alkyl group having 1 to 22 carbon atoms, wherein $R^4$ is selected from the group consisting of a second linear alkyl group having 1 to 6 carbon atoms, an aryl group, and combinations thereof, and
    wherein the hydrophilic polymer is selected from the group consisting of polyacrylamide, guar, hydroxypropyl guar, hydrophobically modified hydroxypropyl guar, carboxymethyl guar, carboxymethyl hydroxypropyl guar, glactomannan gums, derivatized guars, xanthan gum, starch, derivatized starches, saccharides, xanthan, derivatized xanthan and mixtures thereof.

2. The slurry composition according to claim 1, wherein the hydrophilic polymer is polyacrylamide.

3. The slurry composition according to claim 1, wherein the polyacrylamide is a water-soluble polymer having a charge selected from the group consisting of nonionic, positive, negative, and zwitterionic.

4. The slurry composition according to claim 3, wherein the polyacrylamide has a negative charge.

5. The slurry composition according to claim 1, wherein the guar is selected from the group consisting of hydroxypropyl guar, hydrophobically modified hydroxypropyl guar, carboxymethyl guar, carboxymethyl hydroxypropyl guar, glactomannan gums and mixtures thereof.

6. The slurry composition according to claim 1, wherein the nonionic surfactant is selected from the group consisting of a $C_6$-$C_{12}$ ethylene oxide polymer, a $C_6$-$C_{12}$ propylene oxide polymer, a $C_6$-$C_{12}$ ethylene-propylene oxide copolymer, and mixtures thereof.

7. The slurry composition according to claim 1, wherein the base oil is selected from the group consisting of diesel oil, mineral oil, synthetic oil, vegetable oil, fish oil, paraffinics, ester-based oils and combinations thereof.

8. The slurry composition according to claim 1, wherein $R^1$, of formula $[N-R^1R^2R^3R^4]^+$, is a mixture of branched alkyl groups having a number of carbon atoms selected from 12 to 18 carbon atoms.

9. The slurry composition according to claim 1, wherein $R^1$ and $R^2$, of formula $[N-R^1R^2R^3R^4]^+$ of the mixed branched alkyl organoclay, are each a mixture of branched alkyl groups having a number of carbon atoms selected from 12 to 18 carbon atoms.

10. The slurry composition according to claim 1, wherein $R^1$, $R^2$ and $R^3$, of formula $[N-R^1R^2R^3R^4]^+$ of the mixed branched alkyl organoclay, are each a mixture of branched alkyl groups having a number of carbon atoms selected from 12 to 18 carbon atoms.

11. The slurry composition according to claim 8, wherein one or more of $R^2$ and $R^3$, of formula $[N-R^1R^2R^3R^4]^+$ of the mixed branched alkyl organoclay, are each a first linear alkyl group having a number of carbon atoms selected from 1 to 22 total carbon atoms.

12. The slurry composition according to claim 1, wherein $R^4$, of formula $[N-R^1R^2R^3R^4]^+$ of the mixed branched alkyl organoclay, is independently selected from the group consisting of a benzyl group, a methyl group, an ethyl group, a propyl group, a butyl group, a pentyl group and a hexyl group.

13. The slurry composition according to claim 1, wherein one of $R^2$, $R^3$ and $R^4$, of formula of $[N-R^1R^2R^3R^4]^+$ of the mixed branched alkyl organoclay, is methyl.

14. The slurry composition according to claim 1, wherein for formula of $[N-R^1R^2R^3R^4]^+$ of the mixed branched alkyl organoclay, $R^2$ and $R^3$ are methyl and $R^4$ is benzyl.

15. The slurry composition according to claim 1, wherein each branched alkyl group has a distribution of branching points distributed along the linear backbone of the branched alkyl group ranging from a 2 carbon atom position on the linear backbone, counting from a 1 carbon atom position which is bonded to $N^+$, to a ω-2 carbon atom position, where a) is a terminal carbon atom position on the linear backbone.

16. The slurry composition according to claim 1, wherein the phyllosilicate clay comprises a smectite clay selected from the group consisting of: montmorillonite, bentonite, hectorite, saponite, stevensite and beidellite.

17. The slurry composition of claim 16, wherein said smectite clay is selected from bentonite and hectorite, and mixtures thereof.

18. The slurry composition according to claim 8, wherein $R^1$, of formula $[N-R^1R^2R^3R^4]^+$, is a mixture of branched alkyl groups having a number of carbon atoms selected from 14 to 18 carbon atoms.

19. The slurry composition according to claim 9, wherein $R^1$ and $R^2$, of formula $[N-R^1R^2R^3R^4]^+$ of the mixed branched alkyl organoclay, are each a mixture of branched alkyl groups having a number of carbon atoms selected from 14 to 18 carbon atoms.

20. The slurry composition according to claim 10, wherein $R^1$, $R^2$ and $R^3$, of formula $[N-R^1R^2R^3R^4]^+$ of the mixed branched alkyl organoclay, are each a mixture of branched alkyl groups having a number of carbon atoms selected from 14 to 18 carbon atoms.

21. The slurry composition according to claim 11, wherein one or more of $R^2$ and $R^3$, of formula $[N-R^1R^2R^3R^4]^+$ of the mixed branched alkyl organoclay, are each a first linear alkyl group having a number of carbon atoms selected from 12 to 22 total carbon atoms.

22. The slurry composition according to claim 11, wherein one or more of $R^2$ and $R^3$, of formula $[N-R^1R^2R^3R^4]^+$ of the mixed branched alkyl organoclay, are each a first linear alkyl group having a number of carbon atoms selected from 1 to 6 total carbon atoms.

\* \* \* \* \*

UNITED STATES PATENT AND TRADEMARK OFFICE
CERTIFICATE OF CORRECTION

PATENT NO. : 11,718,534 B2  
APPLICATION NO. : 16/854478  
DATED : August 8, 2023  
INVENTOR(S) : Jeffrey Thompson et al.

Page 1 of 1

It is certified that error appears in the above-identified patent and that said Letters Patent is hereby corrected as shown below:

In the Claims

Column 14, Line 3, "a) is a terminal carbon atom position on the linear backbone." should read --ω is a terminal carbon atom position on the linear backbone.--

Signed and Sealed this  
Twenty-sixth Day of September, 2023

Katherine Kelly Vidal  
*Director of the United States Patent and Trademark Office*